United States Patent
Hildebran et al.

(10) Patent No.: US 9,857,781 B2
(45) Date of Patent: Jan. 2, 2018

(54) PEER COMMUNICATION BETWEEN MODULES IN AN INDUSTRIAL CONTROLLER

(71) Applicant: Rockwell Automation Technologies, Inc., Mayfield Heights, OH (US)

(72) Inventors: Bret S. Hildebran, Chagrin Falls, OH (US); Eric D. Decker, Macedonia, OH (US); Duwayne D. Mulhall, Geneva, OH (US); Peter M. Delic, Willoughby, OH (US); Charmaine J. Van Minnen, Aurora, OH (US); Kenwood Hall, Hudson, OH (US); Richard O. Ruggeri, Novelty, OH (US); Harsh Shah, Mayfield Heights, OH (US); Andreas P. Frischknecht, Singapore (SG); Scott A. Pierce, Concord Township, OH (US); Robert J. Kretschmann, Bay Village, OH (US); Mark A. Chaffee, Chagrin Falls, OH (US); Terence S. Tenorio, Solon, OH (US); David A. Pasela, Seven Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 665 days.

(21) Appl. No.: 14/270,159

(22) Filed: May 5, 2014

(65) Prior Publication Data

US 2014/0243999 A1 Aug. 28, 2014

Related U.S. Application Data

(63) Continuation of application No. 13/443,623, filed on Apr. 10, 2012, now Pat. No. 8,762,588.

(Continued)

(51) Int. Cl.
*G06F 3/00* (2006.01)
*G08B 23/00* (2006.01)
(Continued)

(52) U.S. Cl.
CPC .............. *G05B 15/02* (2013.01); *G05B 11/01* (2013.01); *G05B 19/0423* (2013.01);
(Continued)

(58) Field of Classification Search
None
See application file for complete search history.

(56) References Cited

U.S. PATENT DOCUMENTS 6,037,857 A * 3/2000 Behrens ............. G05B 19/0423
307/326
7,194,559 B2 * 3/2007 Salmon ............... G06F 13/4072
327/108

(Continued)

OTHER PUBLICATIONS

Olden et al., "Open-Loop Motor Speed Control with Lavbiew", 2001, South Carolina State University—(4) pages.
NI 6711/6713 Specifications, 2004, NI—(10) pages.

*Primary Examiner* — Hyun Nam
(74) *Attorney, Agent, or Firm* — Boyle Fredrickson, SC

(57) ABSTRACT

An output module for an industrial controller configurable to simplify setup and commissioning is disclosed. The output module includes configurable PWM outputs that may be scheduled to start at different times within the PWM period, that may be configured to generate a fixed number of PWM pulses, and that may have an extendable PWM period. The output terminals are configurable to enter a first state upon generation of a fault and further configurable to enter a second state after a configurable time delay following the fault being generated. The output module may receive inputs signals directly from another module and set output signals at the terminals responsive to these signals.

19 Claims, 9 Drawing Sheets

Related U.S. Application Data

(60) Provisional application No. 61/474,027, filed on Apr. 11, 2011, provisional application No. 61/474,042, filed on Apr. 11, 2011, provisional application No. 61/474,054, filed on Apr. 11, 2011, provisional application No. 61/474,073, filed on Apr. 11, 2011.

(51) Int. Cl.
| | | |
|---|---|---|
| *G05B 15/02* | (2006.01) | |
| *G05B 19/05* | (2006.01) | |
| *G05B 19/414* | (2006.01) | |
| *G06F 13/12* | (2006.01) | |
| *G05B 23/02* | (2006.01) | |
| *G05B 19/042* | (2006.01) | |
| *G05B 11/01* | (2006.01) | |

(52) U.S. Cl.
CPC ....... *G05B 19/0426* (2013.01); *G05B 19/056* (2013.01); *G05B 19/4148* (2013.01); *G05B 23/0205* (2013.01); *G06F 13/124* (2013.01); *G05B 2219/1196* (2013.01); *G05B 2219/21012* (2013.01); *G05B 2219/21021* (2013.01); *G05B 2219/24015* (2013.01); *G05B 2219/33105* (2013.01); *G05B 2219/33333* (2013.01); *G05B 2219/33338* (2013.01); *G05B 2219/34401* (2013.01)

(56) References Cited

U.S. PATENT DOCUMENTS

| | | |
|---|---|---|
| 2005/0197796 A1 | 9/2005 | Daigle et al. |
| 2007/0035396 A1* | 2/2007 | Chand .................... G06Q 30/06 340/572.1 |
| 2011/0029101 A1 | 2/2011 | Castro Scorsi et al. |

\* cited by examiner

FIG. 11

PEER COMMUNICATION BETWEEN MODULES IN AN INDUSTRIAL CONTROLLER

CROSS-REFERENCE TO RELATED APPLICATIONS

This application is a continuation of Ser. No. 13/443,623, filed on Apr. 10, 2012, which, in turn, claims priority to the following U.S. provisional applications, each filed Apr. 11, 2011: Ser. Nos. 61/474,027; 61/474,042; 61/474,054; 61/474,073. The entire contents of each of the above-referenced applications are incorporated herein by reference.

BACKGROUND OF THE INVENTION

The subject matter disclosed herein relates generally to industrial control networks for controlling machines and industrial processes and, more specifically, to an output module receiving data from other nodes in the network and providing signals to control actuators or other devices on the machine or process.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

As industrial processes grow in complexity, an increasing number of devices are being connected to the industrial controller. The devices are often distributed about a machine or along a process line. The increasing number of devices and distribution of these devices about the machine require more complex control programs. Thus, it would be desirable to provide output modules that are configured to simplify setup and commissioning, thereby reducing the time and expense involved in developing the industrial control system.

An industrial network is typically used to connect the distributed devices and to allow data to be transmitted between the devices. However, the increasing number of devices requires an increased volume of communications between those devices. Further, various scan rates on the controller and remote modules as well as transmission delays between devices introduce further challenges to maintain the high reliability and deterministic nature of the control programs. Thus, it would be desirable to provide output modules that are configured to reduce the delay times in communications between devices in order to maintain the high reliability and deterministic nature of the control programs.

It may be desirable to generate a pulse width modulated (PWM) signal at one or more of the output terminals. The PWM signal alternates between an on state and an off state during a defined time period. The duration at which the output is in the on state may be varied within the time period to vary a commanded magnitude between zero and one hundred percent. Alternately, the PWM signal may be output at a fixed duration, such as a 50% duty cycle, in response to an input signal. Thus, the PWM output signal may be used to vary the duty cycle of a controlled process or to initiate a repeated process in response to a desired initial condition being detected at an input.

However, generating a PWM output signal has not been met without certain limitations. Providing the PWM output signal has required the end user to create a program executing on the processor. Further, the processor monitors the input signals, transmitted via a network from a remote location, processes the inputs, and generates a PWM output signal. The PWM output signal typically requires a fixed time period. Transmission, scanning, and processing delays, may result in either additional pulses being generated or desired pulses being dropped in response to input signals. If multiple PWM output signals exist on the same output module, they are turned on at the start of the period and remain on for their respective desired percentage of the period, or duty cycle. However, turning on each of the outputs at the same time results in maximum loading of the output module. Thus, it would be desirable to provide an output module that generates a PWM output signal, addressing the aforementioned limitations.

BRIEF DESCRIPTION OF THE INVENTION

The subject matter disclosed herein describes an output module for an industrial controller that is configurable to simplify setup and commissioning. The output module includes configurable PWM outputs that may be scheduled to start at different times within the PWM period, that may be configured to generate a fixed number of PWM pulses, and that may have an extendable PWM period. The output terminals are configurable to enter a first state upon generation of a fault and further configurable to enter a second state after a configurable time delay following the fault being generated. The output module may receive inputs signals directly from another module and set output signals at the terminals responsive to these signals.

According to one embodiment of the invention, an output module for an industrial controller includes a plurality of output terminals configured to generate an output signal and a memory device configured to store a series of instructions and a plurality of configuration parameters. The configuration parameters define at least one pulse width modulated waveform. A processor is configured to execute the series of instructions to read the configuration parameters, generate at least one pulse width modulated output waveform as a function of the configuration parameters, and output each pulse width modulated waveform at one of the output terminals.

According to another aspect of the invention, a scheduling module may be stored in the memory device and the processor further configured to execute the scheduling module to assign the start of the on time for at least one of the pulse width modulated waveforms at a first time within the PWM period and at least one of the pulse width modulated waveforms at a second time within the PWM period. The start of the on time for a second pulse width modulated waveform is set equal to, or shortly after, the end of the on time for a first pulse width modulated waveform.

According to still other aspects of the invention, the output module may include configuration parameters which define a fixed number of pulses to be generated, and the processor generates at least one of the pulse width modulated waveforms having the fixed number of pulses in response to an input signal. The output module may include configuration parameters which define a minimum on time, a period of the pulse width modulation waveform, and a variable on time. The processor is further configured to execute the instructions to compare the variable on time to the minimum on time, generate a first pulse width modulated output waveform as a function of the configuration parameters if the variable on time is greater than or equal to the minimum on time, and generate a second pulse width modulated output waveform as a function of the configuration parameters if the variable on time is less than the minimum on time.

According to another embodiment of the invention, an output module for an industrial controller includes a plurality of output terminals configured to generate an output signal and a memory device configured to store a series of instructions and a plurality of configuration parameters. A processor is configured to execute the series of instructions to read the configuration parameters, detect a fault condition, place each of the plurality of outputs in a first fault state as a function of the fault condition and the configuration parameters, delay for a time as a function of the configuration parameters, and place each of the plurality of outputs in a second fault state as a function of the fault condition and the configuration parameters.

According to yet another embodiment of the invention, an output module for an industrial controller is disclosed. The industrial controller includes a central processor, at least one output module, and at least one input module. The output module includes a plurality of output terminals configured to generate an output signal, a first interface for receiving control data from the central processor, and a second interface for receiving the status of at least one input signal from the input module. The second interface does not pass through the central processor. A memory device is configured to store a series of instructions, and a processor is configured to execute the series of instructions to generate the output signals for each output terminal as a function of the control data from the central processor and of the status of the at least one input signal from the input module.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like pans throughout, and in which:

FIG. 11 is an exemplary screen for an operator interface to configure an output module according to one embodiment of the present invention;

Figure 1:
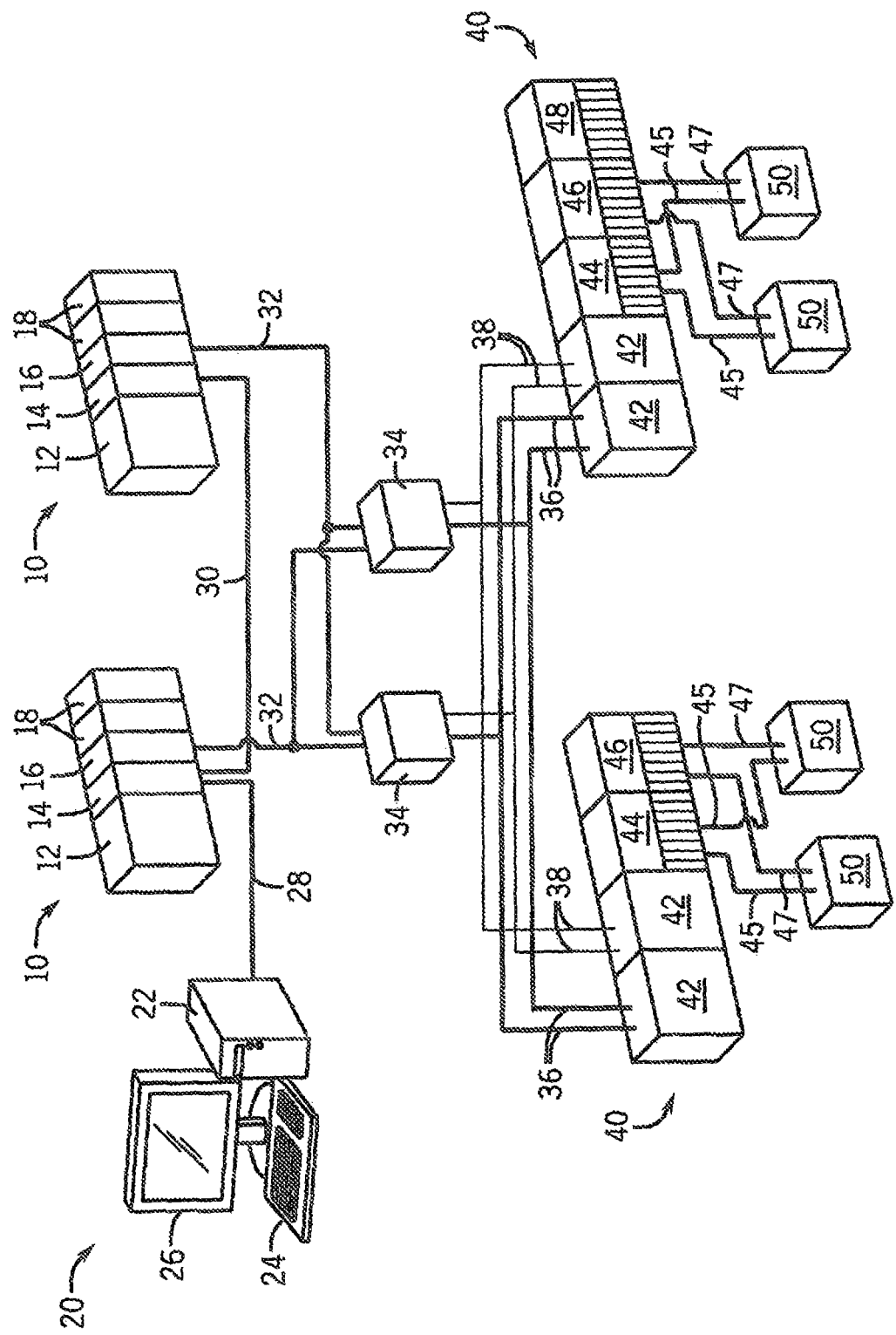
FIG. 1 is a schematic representation of an exemplary industrial control network incorporating an output module according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Turning initially to FIG. 1, an exemplary industrial control network includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16. Each industrial controller 10 is further shown with two additional modules 18 that may be selected according to the application requirements and may be, for example, analog or digital input or output modules.

One or more operator interfaces 20 may be connected to the industrial control network. Each operator interface 20 may include a processing device 22, input device 24, including, but not limited to, a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
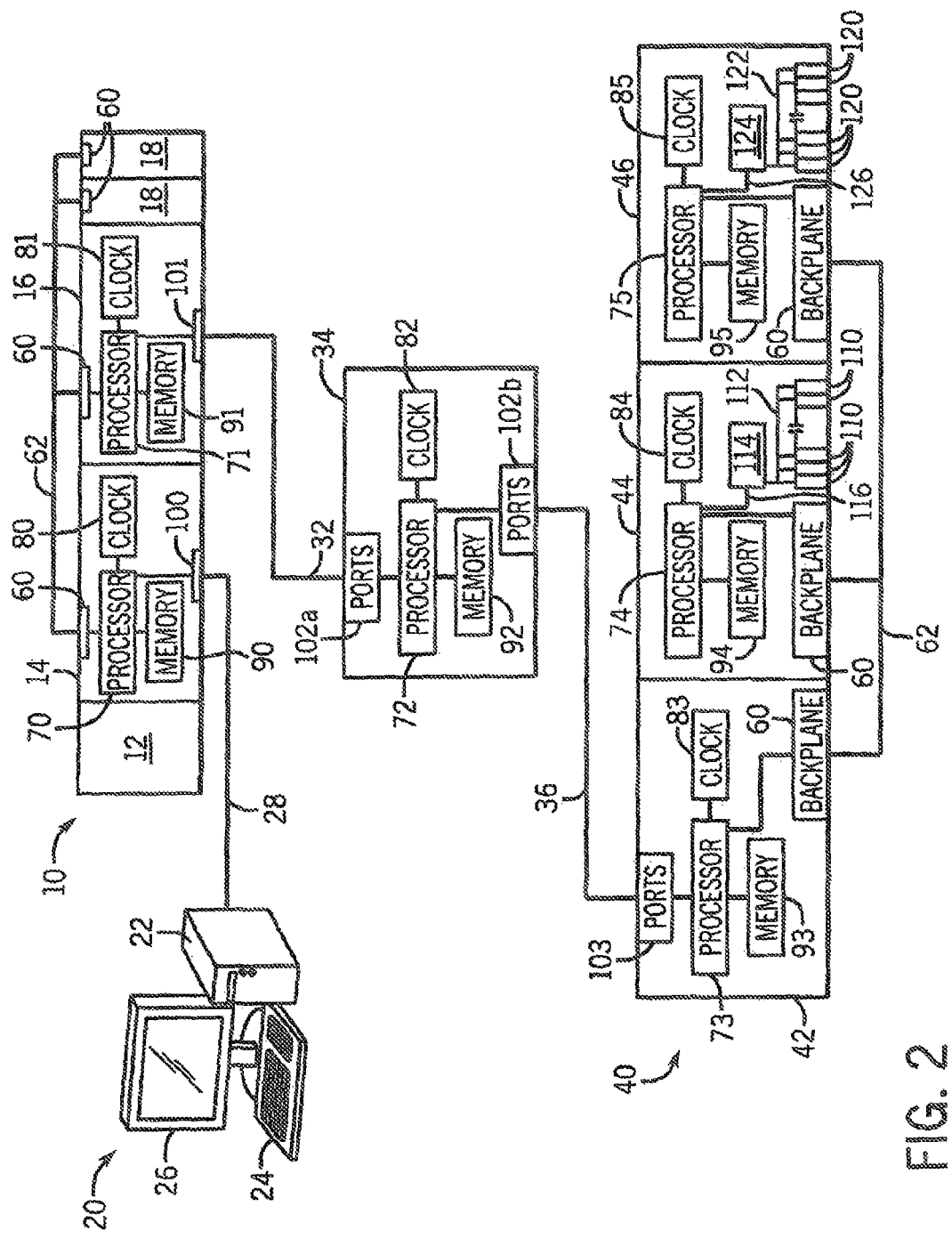
FIG. 2 is a block diagram representation of a portion of the exemplary industrial control network of FIG. 1.

Referring next to FIG. 2, a portion of the exemplary industrial control network of FIG. 1 is illustrated in block diagram form. Due to factors such as the increasingly distributed nature of the control network and the increasing capability and reduced cost of processing devices, it is contemplated that each of the nodes in the network may include a processor 70-75 and a memory device 90-95. The processors 70-75 are configured to execute instructions and to access or store operating data and/or configuration parameters stored in the corresponding memory device 90-95. The processors 70-75 may be any suitable processor according to the node requirements. It is contemplated that processors 70-75 may include a single processing device or multiple processing devices executing in parallel and may be implemented in separate electronic devices or incorporated on a single electronic device, such as a field programmable gate array (FPGA) or application specific integrated circuit (ASIC). Similarly, the memory devices 90-95 may be a single device, multiple devices or may be incorporated in part or in whole within the FPGA or ASIC. Each of the nodes also includes a clock 80-85, and each clock 80-85 is preferably synchronized with the other clocks 80-85 according to, for example, the IEEE-1588 clock synchronization standard. Communication between nodes mounted in the same rack and/or contained within a single housing occurs via a backplane 62 and a corresponding backplane connector 60. Nodes communicating via network media 28, 32, 36 include ports 100-103 configured to process the corresponding network protocol. Each input module 44 includes input terminals 110 configured to receive the input signals 45 from the controlled devices 50. The input module 44 also includes any associated logic circuitry 114 and internal connections 112, 116 required to process and transfer the input signals 45 from the input terminals 110 to the processor 74. Similarly, each output module 46 includes output terminals 120 configured to transmit the output signals 47 to the controlled devices 50. The output module 46 also includes any associated logic circuitry 124 and internal connections 122, 126 required to process and transfer the output signals 47 from the processor 75 to the output terminals 120.

Figure 11:
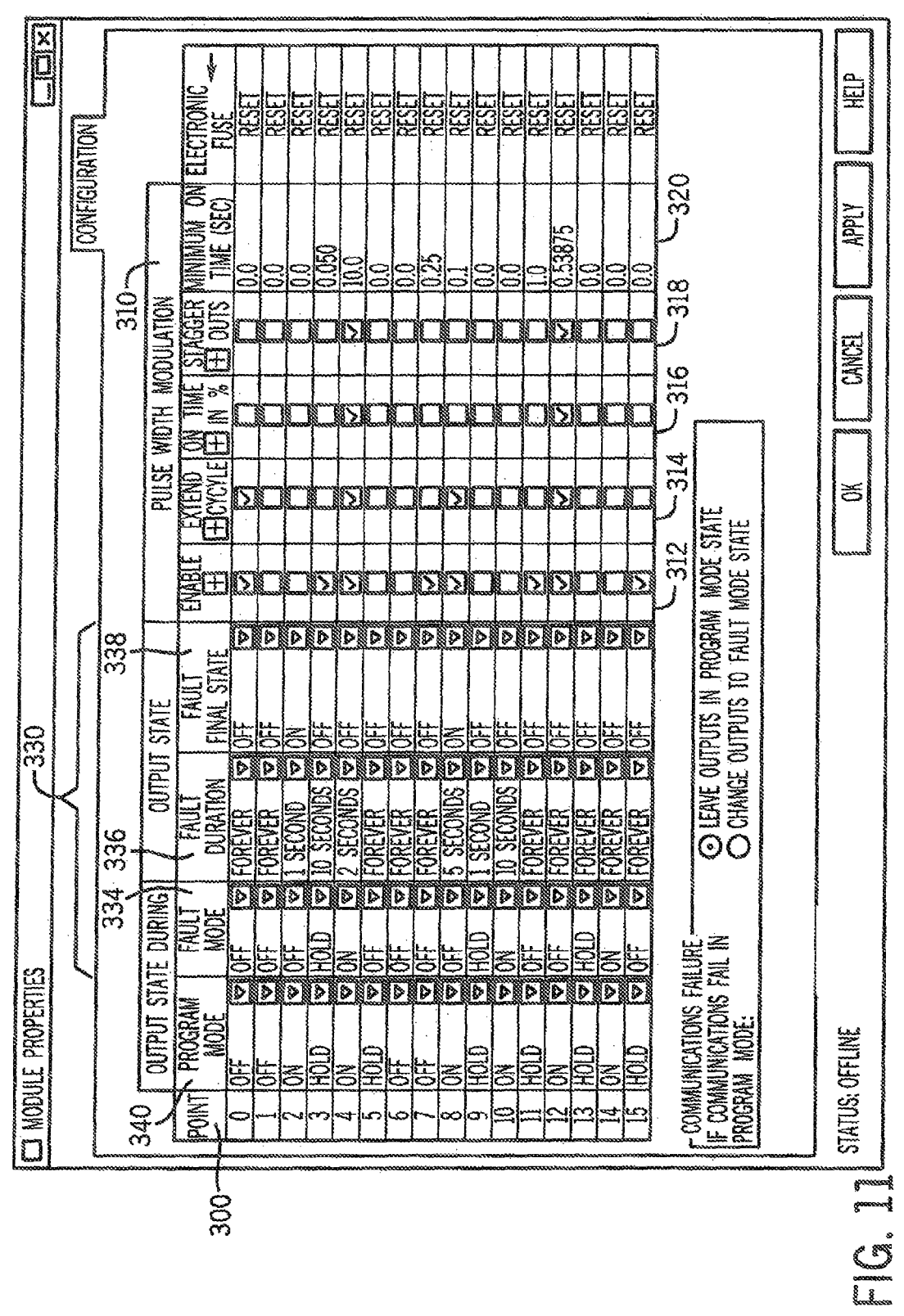

According to one aspect of the invention, the output module 46 is configurable to generate a PWM output signal at one or more of the output terminals 120. Configuration parameters are stored in the memory device 95. The configuration parameters may be modified via the operator interface 20 and network connections. Optionally, the configuration parameters may be preset in a remote programming environment and loaded into the memory device. As still another option, the configuration parameters may be modified by the control program during execution, adjusting the PWM output signal according to the operating conditions. Referring to FIG. 11, an exemplary configuration window for an output module 46 having sixteen output terminals 120 is illustrated. Each output terminal 120 is defined as a point from 0 to 15. The PWM configuration portion 310 of the window includes five columns, corresponding to five configuration parameters, separately configurable for each of the output terminals 120. The enable column 312 is used to select whether the corresponding output terminal 120 will generate a PWM output. The extend cycle column 314 is used to select how the PWM waveform generated for the corresponding output terminal 120 responds to a commanded on time less than the minimum on time as discussed in more detail below. The on time in % column 316 selects whether the on time is to be specified as a percentage of the total PWM period or as an actual duration given in seconds. The minimum on time column 320 defines the minimum on time for the corresponding output terminal 120 during each PWM period. The stagger outs column 318 is used to indicate whether a scheduling module executing on the processor 75 is used to vary the start of the on time for the corresponding output terminal 120 with respect to other output terminals 120 generating PWM outputs.

Figure 3:
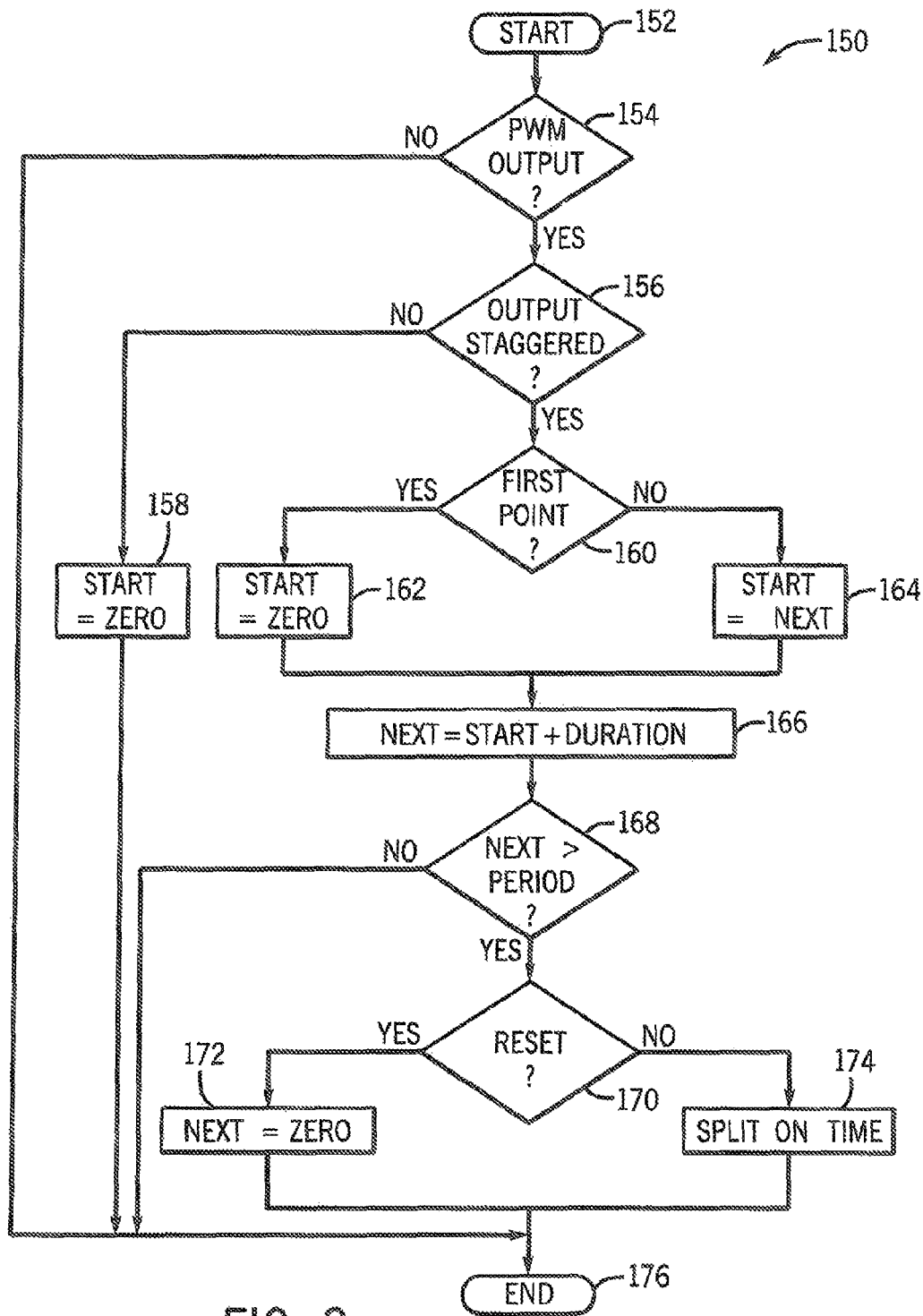
FIG. 3 is a flowchart illustrating the steps in a scheduling module to stagger the start of on times for multiple pulse width modulated output points.

The scheduling module executes as illustrated in the flowchart 150 of FIG. 3. Output modules 46 may be configured to have different numbers of output terminals 120, including but not limited to eight, sixteen, or thirty-two output terminals per output module 46. The scheduling module executes each of the steps 152-176 in FIG. 3 for each output terminal 120 on the output module 46. The scheduling module may be configured to run a single time upon startup, based on a user input, for example, during initial commissioning, or at a periodic interval to adjust the PWM schedule according to the requirements of the controlled machine or process. At step 154, the scheduling module reads the configuration parameters from the memory device 95 to determine whether the output terminal 120 is configured to generate a PWM signal. If the output terminal 120 is not configured to generate a PWM signal, the scheduling module ends for that terminal 120. If the output terminal 120 is configured to generate a PWM signal, the scheduling module next reads the configuration parameters from the memory device 95 to determine whether the start time for that output terminal 120 is to be staggered, as shown at step 156. According to step 158, if the start time for the PWM signal of that output terminal 120 is not staggered, then the on time begins at the start of the PWM period, T.

If the start time for the PWM signal of that output terminal 120 is staggered, the scheduling module then determines at what point within the period, T, that the output signal 47 generated by that output terminal 120 turns on. If the output terminal 120 is the first terminal 120 on the output module 46 configured to generate a PWM output, then the start time for the PWM signal is the start of the PWM period, as shown in steps 160 and 162. For each subsequent output terminal 120 on the output module 46 configured to generate a PWM output, the start time for the PWM signal is the next start time as shown in steps 160 and 164 where the next start time is determined at step 166. The next start time is set equal to the end time of the current PWM signal, such that the on time for the second output terminal 120 configured to generate a PWM signal begins when the on time for the first output terminal 120 configured to generate a PWM signal ends. Optionally, the next start time may be set for a short time, such as fifty microseconds, after the end time of the current PWM signal, providing time for the prior output terminal 120 to turn fully off. At step 168, the scheduling module determines whether the next start time is scheduled beyond the end of the period, T, of the present PWM cycle. If so, the scheduling module may be configured to either reset the next start time to the start of the PWM cycle, as shown in steps 170 and 172, or to schedule a portion of the on time at the end of the PWM cycle and roll the remaining portion of the on time back to the beginning of the PWM cycle as shown in steps 170 and 174.

According to one embodiment of the invention, the scheduling module is configured to execute at the start of each PWM cycle. For applications in which different output terminals have periods of varying duration, the scheduling module staggers the start time of PWM signals for each output terminal having the same period. Optionally, if two periods are integral multiples of each other, the scheduling module may stagger the start of each set of output terminals having a period that starts at the same time. Executing the scheduling module at the start of each PWM period permits the scheduled start time for PWM signals to vary as the duty cycle of the PWM signal varies.

Figure 4:
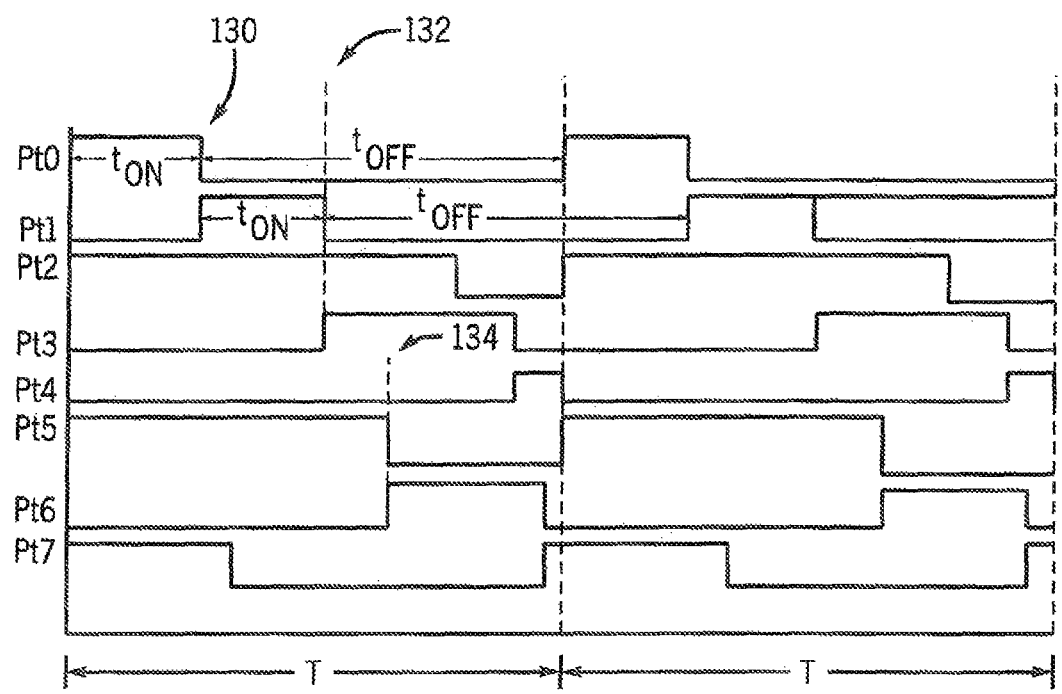
FIG. 4 is a graphical representation of a staggered schedule of on times for multiple pulse width modulated output points.

Referring also to FIG. 4, an exemplary PWM schedule is illustrated for eight output terminals, Pt0-Pt7, of an output module 46. Each of the output points, Pt0-Pt7, is configured to generate a PWM output, but only output terminals, Pt0, Pt1, and Pt3-Pt7 are configured to stagger the start of the on time for the respective PWM output. The on time, $t_{on}$, of the first output terminal, Pt0, begins at the start of the PWM period, T. The on time, $t_{on}$, of the second output terminal, Pt1, begins at time 130, corresponding to the end of the on time, $t_{on}$, of the first output terminal, Pt0. Because the third output terminal, Pt2, does not have a staggered start time, the on time, $t_{on}$, for the third output terminal, Pt2, begins at the start of the PWM period, T. The fourth output terminal, Pt3, is configured to have a staggered start time and, therefore, the on time, $t_{on}$, of the fourth output terminal, Pt3, begins at time 132 corresponding to the end of the on time, $t_{on}$, of the second output terminal, Pt1. Because the end of the on time, $t_{on}$, for the fifth output terminal. Pt4, corresponds to the end of the PWM period, T, the start of the on time, $t_{on}$, for the sixth output terminal, Pt5, corresponds to the start of the PWM period, T. The eight output terminal, Pt7, illustrates one option for the scheduling module to handle an on time, $t_{on}$, that begins at the end of the on time, $t_{on}$, for the prior output terminal, Pt6, and then extends beyond the end of the PWM period, T. According to the illustrated embodiment, a portion of the first on time, $t_{on}$, is executed at the start of the first PWM period, T, with the remainder of the on time, $t_{on}$, executing at the end of the first PWM period, T. Although the subsequent periods, T, divide the on time, $t_{on}$, in a similar manner, the end result is the appearance of the on time, $t_{on}$, for the eighth output terminal, Pt7, extending between two periods, T. Optionally, the start of the on time, $t_{on}$, for the eighth output terminal, Pt7, may be set to the start of the PWM period, T, and any subsequent output terminal begin from the end of the on time, $t_{on}$, for that terminal.

Figure 5:
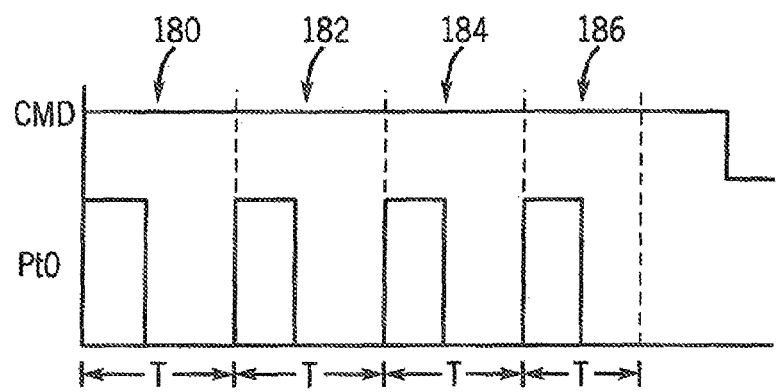
FIG. 5 is a graphical representation of a pulse width modulated output generating a fixed number of pulses to avoid additional pulse generation.
Figure 6:
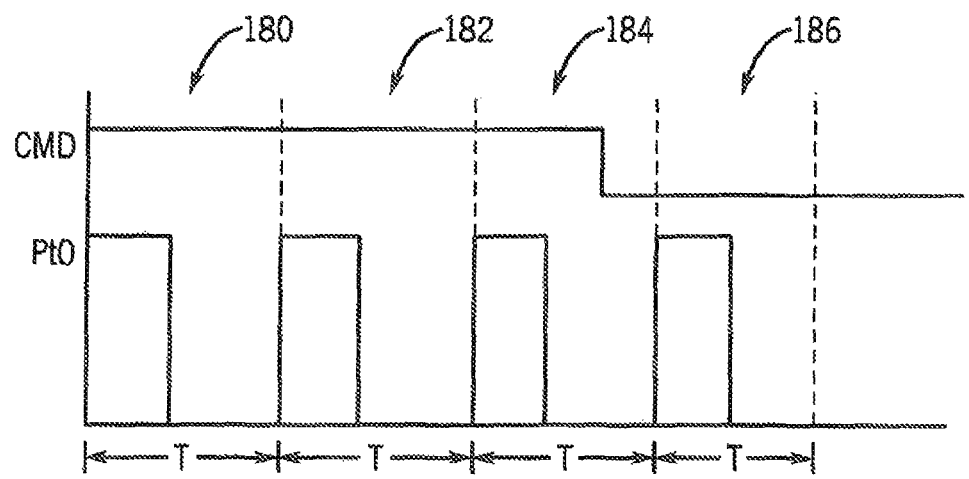
FIG. 6 is a graphical representation of a pulse width modulated output generating a fixed number of pulses to avoid dropping pulses.

Referring next to FIGS. 5 and 6, the output module 46 may be configured to generate the PWM waveform at an output terminal 120 responsive to a command signal, CMD. The command signal may be generated by the control program executing in the processor module 14 as a function of one or more input signals 45 or internal states, for example, a counter done bit. Optionally, the command signal, CMD, may be generated as a function of a portion of the control program executing on the processor 75 at the output module 46 as described in more detail below with respect to peer-to-peer communications.

In certain applications, it is desirable to generate a fixed number of pulses of the PWM waveform rather than providing a continuous PWM output while the command signal is active. For example, a square object may reach a work station, setting an input for a proximity switch or any other such detection device that indicates the object is in position. The process may require that an action (e.g., printing, stamping, inspecting, drilling, etc. . . . ) be performed on each side of the object. The PWM output may be used to energize an actuator that performs the action during the on time of the PWM waveform. An indexing device then rotates the square object during the off time of the PWM waveform such that the next side is in position at the next on time. However, if the input signal is remote from the controller, delay times are inherent in the control system, for example, scan times of the remote 110 rack and of the input image at the controller, transmission times between the remote 110 rack and the controller, processing delays of the controller, and update delays in setting the command in the output image. The delays may result in an additional pulse causing one side of the object to be acted upon a second time or in a pulse being dropped causing one side of the object to not be acted upon. Therefore, it would be desirable to control the PWM waveform to generate a fixed number of output pulses (i.e., four (4) in the exemplary process).

Referring to FIG. 5, the output module 46 is configured to output four pulses in response to the command signal becoming active. A single PWM waveform, having a fixed on time, is illustrated as being output on the first output channel, Pt0. Responsive to the command signal, CMD, becoming active a pulse is generated during each of the first period 180, second period 182, third period 184, and fourth period 186. However, as illustrated, the command signal remains on beyond the end of the fourth period 186. A configuration parameter stored in the memory device 95 may be set or reset to enable or disable, respectively, a cycle limit for the PWM waveform. If set, a second configuration parameter stores a number of pulses output by the PWM waveform in response to the command signal being active. As illustrated in FIG. 5, the number of pulses is set to four. When the command signal remains on into the fifth period and if the cycle limit configuration parameter is set, no additional pulse is generated. Upon removal of the command signal, the cycle limit is reset, readying the output, Pt0, to generate four additional pulses the next time the command signal becomes active. Alternately, if the configuration parameter for cycle limit is disabled and the command signal remained on into the fifth period, the output, Pt0, would generate a fifth pulse and continue to generate pulses until the command signal is deactivated.

Referring to FIG. 6, the output module 48 is again configured to output four pulses in response to the command signal becoming active. A single PWM waveform, having a fixed on time, is illustrated as being output on the first output channel, Pt0. Responsive to the command signal, CMD, becoming active a pulse is generated during each of the first period 180, second period 182, third period 184, and fourth period 186. However, as illustrated, the command signal turned off before the start of the fourth period 186. A configuration parameter stored in the memory device 95 may be set or reset to enable or disable, respectively, executing each of the desired cycles set in the configuration parameter that stores the a number of pulses to be output by the PWM waveform in response to the command signal being active. As illustrated in FIG. 6, the number of pulses is set to four. Despite the command signal turning off prior to the start of the fourth period 186, if the execute all cycles configuration parameter is enabled, the fourth pulse is still generated. Upon completion of the fourth pulse, the cycle limit is reset, readying the output, Pt0, to generate four additional pulses the next time the command signal becomes active. Alternately, if the configuration parameter for executing all cycles is disabled, the output, Pt0, would only generate three pulses, stopping the PWM output signal when the command signal is deactivated.

In certain applications, the output module 48 may be configured to generate a PWM waveform having a variable duration on time. However, there is often a practical limit to the minimum on time that a PWM waveform may have. For example, a burner may need to be on for several to tens of seconds before increasing the temperature of the object being heated. Similarly, even fast acting devices, such as electronic solenoids, require a finite time to move from a de-energized state to an energized state. As shown in FIG. 11, a configuration parameter 320 may store the minimum on time for each output terminal 120 generating a PWM waveform.

Figure 7:
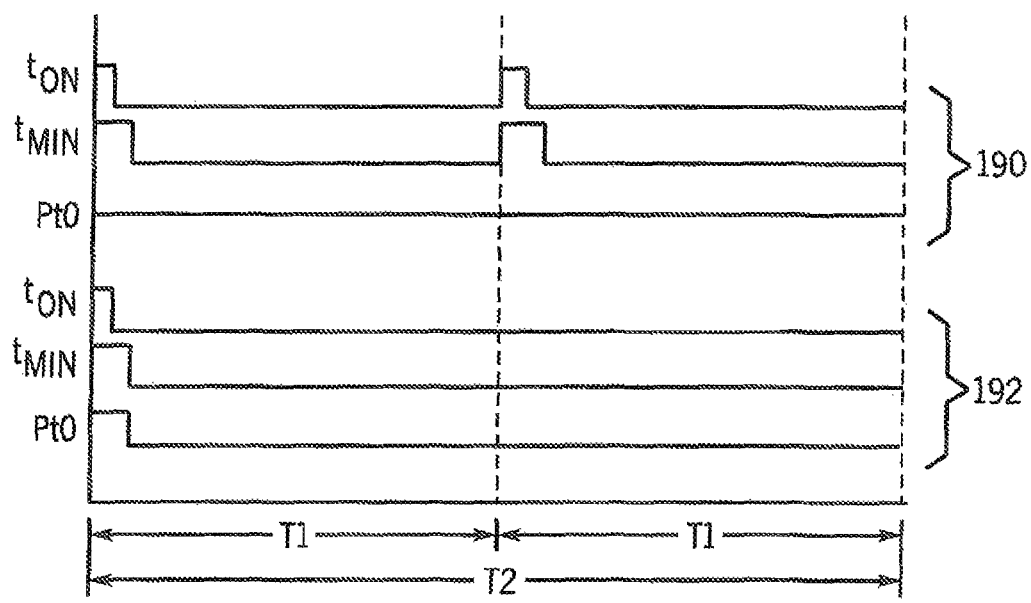
FIG. 7 is a graphical representation of extending the period of a pulse width modulated output to extend the range of signals generated at the output.

The desired PWM waveform is generated in the processor 75 according to the application requirements. The desired period, T, is read from memory 95 and the on time varied from 0-100% of the period, T. During operation, it may be desirable to have an on time less than the minimum on time allowed as set in the configuration parameters. For example, a controlled process requires an output to be on for 1 second, but the minimum on time is two seconds. Referring now to FIG. 7, the first set of waveforms 190 illustrate the PWM waveform generated when the extend cycle configuration parameter is disabled. The first period, T1, may be for example 10 seconds. The desired on time is 1 second, but the output terminal, Pt0, remains off because the minimum on time is 2 seconds. Thus, no PWM waveform is generated until the on time equals or exceeds 2 seconds. In contrast, the second set of waveforms 192 illustrate the PWM waveform generated when the extend cycle configuration parameter is enabled. A new period, T2, for the PWM waveform is calculated. The period is extended such that the new period, T2, is equal to the duration of the original period, T1, times the ratio of the minimum on time to the desired on time. According to this example, the period is, therefore, extended to 20 seconds. The on time for the output terminal is set equal to the minimum on time of 2 seconds. As a result, a PWM waveform is generated that has the desired ratio of on time to off time while satisfying the minimum on time requirement 320 for the output terminal 120.

Figure 8:
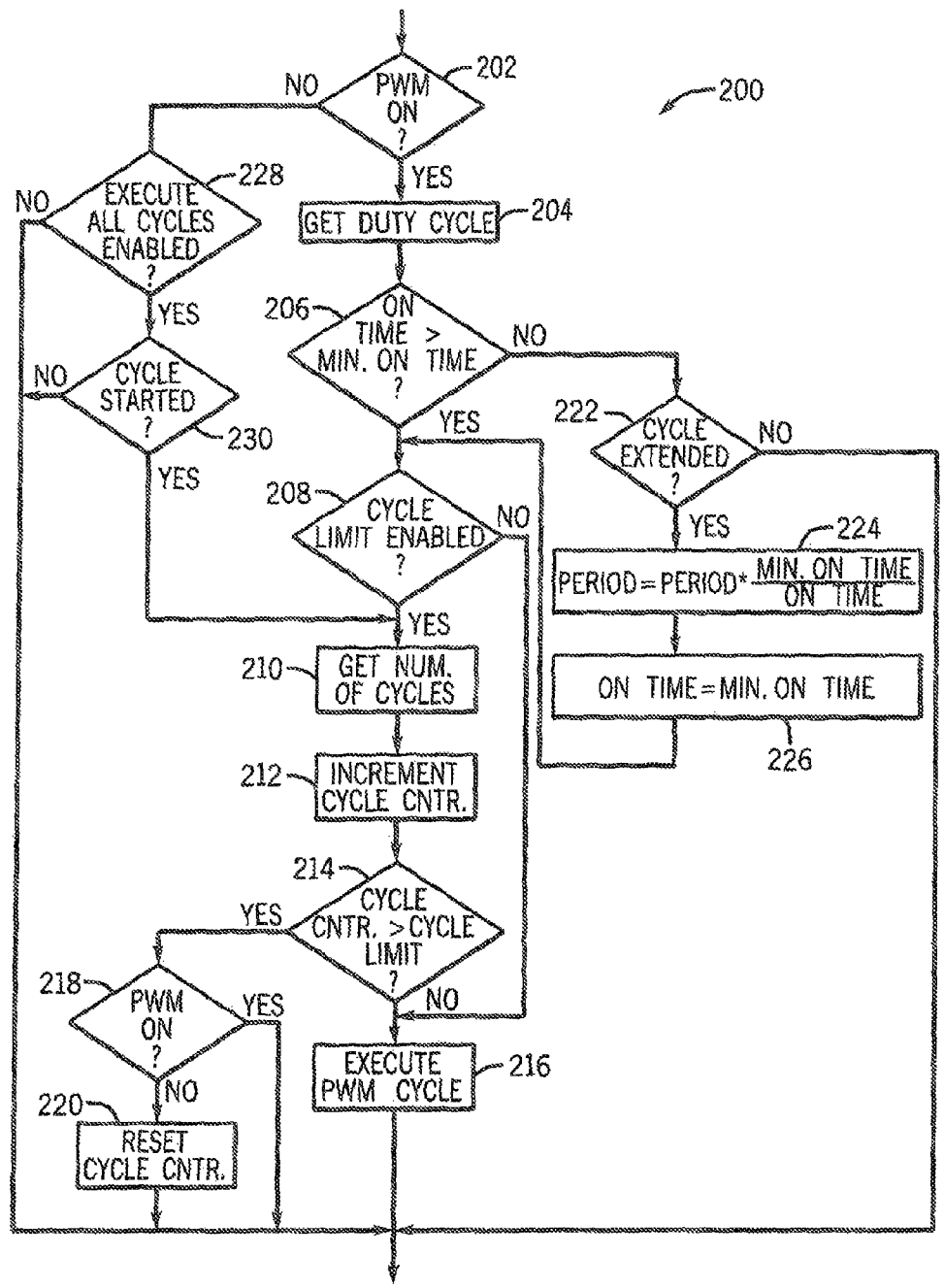
FIG. 8 is a flowchart illustrating the steps in generating a pulse width modulated output signal according to an exemplary embodiment of the invention.

Referring next to FIG. 8, steps in a PWM waveform generation module 200 executing on the processor 75 in the output module 46 as a function of configuration parameters stored in memory 95 is illustrated. The steps are repeatedly executed on a periodic basis for each of the output terminals 120 in the output module 46 configured to generate a PWM waveform. At step 202, the PWM waveform generation module determines whether the output terminal 120 is being commanded to generate a PWM waveform. If not, steps 228 and 230 determine whether the output terminal 120 has been configured to execute all cycles and whether at least a portion of the pulses have already been generated. If the output is neither configured to execute all cycles nor have a portion of the pulses already been generated, then no PWM waveform is generated at that output. If the output is configured to execute all cycles and a portion of the pulses have been generated, the PWM waveform will continue to be generated until the desired number of pulses has been generated.

If the output terminal 120 is commanded to generate a PWM waveform, the duty cycle, or percent on time within one PWM period, T, is determined at step 204. The on-time may be of fixed duration and stored as a configuration parameter or it may be of a variable duration and generated by the processor 75 according to the application requirements. At step 206, the on time is compared to the minimum on time 320. If the on time is less than the minimum on time, PWM waveform generation module determines whether the extend cycle 314 configuration parameter is set, as shown in step 222. If the on time is less than the minimum on time and the extend cycle 314 parameter is not set, no PWM waveform is generated. If the on time is less than the minimum on time and the extend cycle 314 parameter is set, the period and on time are adjusted as discussed above and shown in steps 224 and 226 and the PWM waveform is generated at step 216 as a function of the new period and on time.

If the output terminal 120 is commanded to generate a PWM waveform and the duty cycle is greater than the minimum on time, the PWM waveform generation module continues at step 208 to determine whether the cycle limit configuration parameter is set. If not, the PWM waveform generation module begins generating a continuous PWM waveform according to the desired duty cycle and period, T. If the cycle limit configuration parameter is set, the PWM waveform generation module reads the desired number of cycles as shown in step 210. The desired number of cycles may be fixed and stored in a configuration parameter or variable and determined by the PWM waveform generation module according to the application requirements. As shown in step 212, the PWM waveform generation module increments a counter for each pulse of the PWM waveform output. The PWM waveform generation module generates the PWM waveform until the counter reaches the desired number of cycles as shown in steps 214 and 216. If the counter reaches the desired number of cycles and the command to generate a PWM waveform is still on, the PWM waveform generation module exits without generating further pulses, as shown in steps 214 and 218. Once the command to generate a PWM waveform is removed, the counter is reset such that the PWM waveform generation module is ready to generate the desired number of pulses when the command is re-enabled, as shown in step 220. It is understood that the steps 200 illustrated in FIG. 8 are representative of one embodiment of the PWM waveform generation module and the steps may be rearranged, executed in a varying order, or steps added or removed according to the configuration parameters without deviating from the scope of the invention.

It is further contemplated that each output terminal 120 may be configured to generate a pulse train output (PTO). The was of a PTO is similar to that of a PWM waveform as previously discussed, except that the PTO waveform is a square wave having a fifty percent duty cycle. A second output terminal 120 may be configured in cooperation with each output terminal 120 configured to generate a PTO, where the second output terminal 120 defines a polarity, such as forward/reverse or up/down, of the controlled object receiving the PTO. The frequency, or rate at which pulses are output, controls the rate at which the controlled object responds to the PTO waveform. For example, a stepper motor may receive the PTO waveform such that the motor increments a fixed amount in response to each pulse of the PTO waveform. The direction of rotation is controlled by a direction signal generated by the second output terminal 120, and the speed of rotation is controlled by the rate at which the pulses are output from the first output terminal 120.

Figure 12:
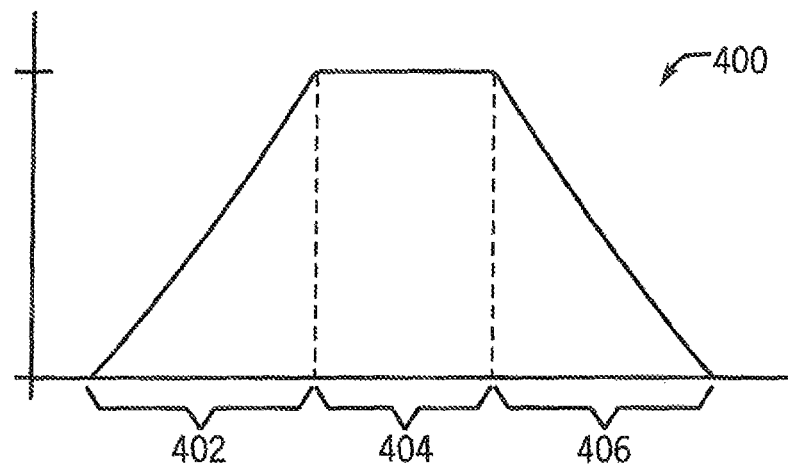
FIG. 12 is an exemplary profile for a PWM or PTO output stored in an output module according to one embodiment of the present invention.
Figure 13:
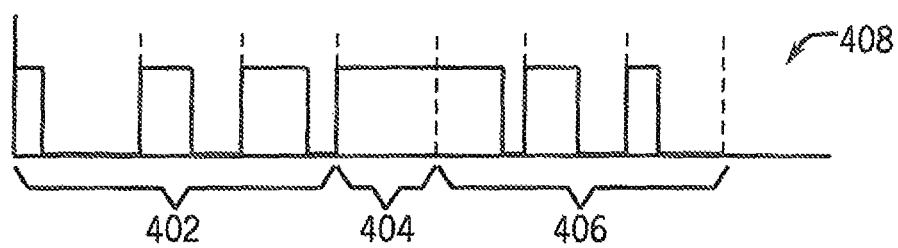
FIG. 13 is an exemplary PWM waveform generated as a result of the profile of FIG. 12.
Figure 14:
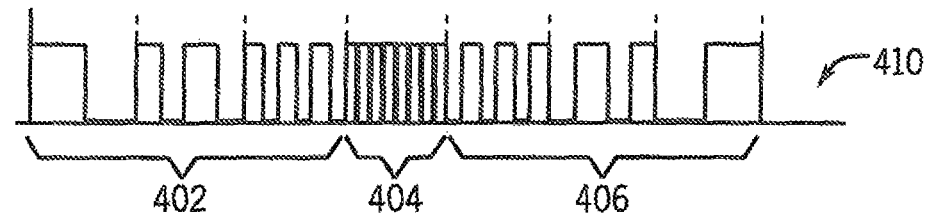
FIG. 14 is an exemplary PTO waveform generated as a result of the profile of FIG. 12.

Each of the PWM waveforms and PTO signals may include a profile 400 stored in the memory device 95. As illustrated in FIG. 12, the profile 400 may include an acceleration ramp 402, constant operating point 404, and a deceleration ramp 406. Optionally, any other profile 400 may be stored, including but not limited to, a simple on/off profile or an s-curve acceleration and deceleration profile. Configuration parameters stored in the memory device 95 define the profile 400, including, but not limited to, the desired constant operating point, the type of acceleration or deceleration ramp, the duration of the acceleration and deceleration ramps, and the duration of constant operation. Referring also to FIGS. 13 and 14, an exemplary PWM waveform 408 and an exemplary PTO waveform 410 are respectively illustrated to control a device 50 according to the profile 400 in FIG. 12. The PWM waveform 408 includes an acceleration ramp 402 in which the period of the waveform remains constant but the duty cycle increases. At the constant operating point 404, the period and duty cycle of the PWM waveform remain constant. As illustrated, the duty cycle is 100%, meaning the output is shown as fully on. As a result, the controlled device 50 will operate at rated, or maximum, operation. Optionally, the duty cycle may be less than one hundred percent but remain constant over several periods to generate constant operation at a point less than its maximum operating point. Finally, the PWM waveform 408 includes a deceleration ramp 406 in which the period of the waveform remains constant and the duty cycle decreases. The PTO waveform 410 includes an acceleration ramp 402 in which the duty cycle remains fixed but the period of the waveform decreases. At the constant operating point 404, both the duty cycle and the period of the PTO waveform 410 remain constant. During the deceleration ramp 406, the duty cycle again remains constant but the period of the PTO waveform increase.

By storing profiles 400 in the output module 46, simple motion control tasks may be performed by the output module 46 rather than transmitting output signals from the processor module 14 to the output module 46. Execution of the profiles may be initiated by a status bit transmitted from the processor module 14 or, as described below, directly from an input signal transferred in a peer-to-peer connection from an input module. It is further contemplated that a time offset configuration parameter may be associated with each profile. Rather than executing immediately upon receipt of the initiation signal, the time signal from the clock 85 may be monitored and execution may be delayed for the duration of the time offset.

The output module 46 may be further configured to count pulses generated by an output terminal 120 configured to generate either a PWM or PTO waveform. Configuration parameters define registers and/or variables used by each counter, including, but not limited to a register for the accumulated value of output pulses or for the On and Off setting of watch windows. According to one embodiment of the invention, the output module 46 includes configuration parameters that define a first and second watch window. Each watch window includes separate On and an Off parameter. When the accumulated value of output pulses reaches the value of counts in the On parameter, the window is activated. The window remains active until the accumulated value of output pulses reaches the value of counts in the Off parameter. An output terminal 120 may be configured to generate an output signal 47 while one of the windows is active. Each watch window may, for example, be used in cooperation with the stored profile, to activate a second device during a portion of the time a first device is being controlled by the profile. As an example, the profile may control a motor that rotates a work piece for one revolution. The watch window may activate a blower, cutting device, printer, or any of a number of other such devices to act on the work piece for a desired portion of the revolution.

As the industrial controller network executes, conditions may arise in the controlled machine or process or within the control network that generate a fault condition. In some applications, it may be time consuming and costly to shut down and restart the controlled machine or process in response to every fault condition. Further, some fault conditions may either be resolved directly or a redundant component may take over for the faulted component, allowing the control network to continue operating. Thus, the output module 46 may be configured to include an intermediate fault state, allowing the industrial control network an opportunity to recovery in the event of a fault condition.

Referring next to FIG. 11, the output module 46 includes a set of fault handling configuration parameters 330 to control how each of the output terminals 120 of the output module 46 respond under fault conditions. Each output terminal 120 is configured to enter an initial state, as defined in the output state during a fault mode column 334, when a fault condition occurs. The output terminal 120 may switch to an off state, an on state, or remain in its present state. Each output terminal 120 may is further configured to maintain this initial state for a predefined time 336. According to one embodiment of the invention, the duration of the intermediate state may be between 0-10 seconds. Optionally, the output terminal may be configured to remain in the initial fault state indefinitely, or until the fault is cleared and normal operation resumes. Upon completion of the duration of the intermediate state, each output terminal 120 is further configured to enter a final fault state 338. Again, each output terminal 120 may be configured to switch to an off state, an on state, or remain in its present state.

As previously discussed, some time delays may result from locating output modules at a remote location from the processor module 14. For example, a control program executing in the processor module 14 requires input data from an input module to determine the resultant state of an output terminal 120 in the output module 46. Delays may result, for example, from the scan times of the input and output images at the remote input and output modules and at the processor module. Transmission and processing scan times may introduce further delays between when the input signal changes state and when the state of an output terminal 120 updated in response to the input signal. Thus, each output module 46 may be configured to interface directly with other modules, such as an input module 44.

Figure 9:
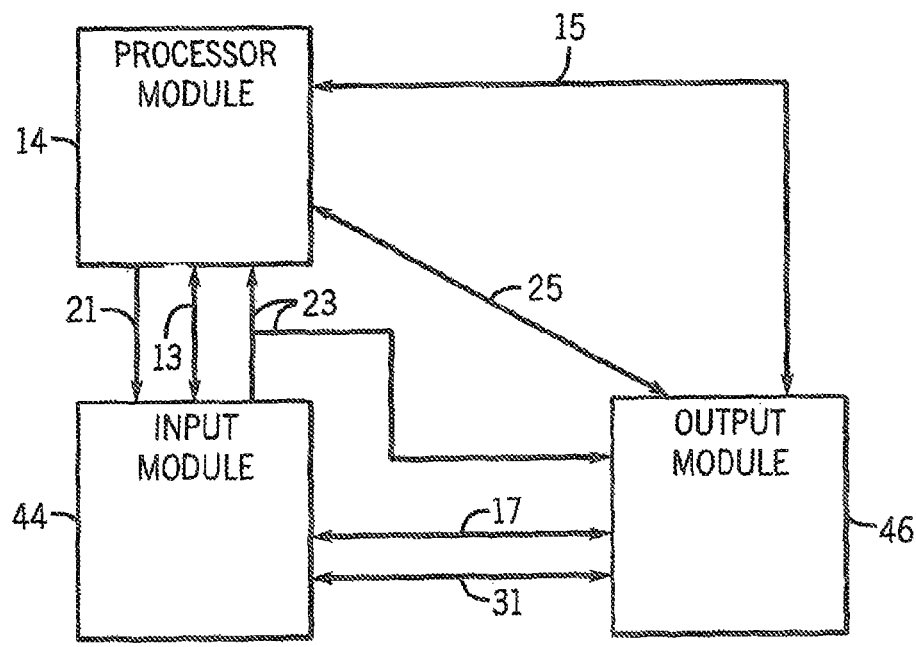
FIG. 9 is a block diagram representation of an output module receiving input image data directly from an input module in the control network.

Referring next to FIG. 9, the process for configuring peer-to-peer communications and subsequent data transmission according to one embodiment of the invention is illustrated. The industrial control network includes at least one processor module 14, output module 46, and input module 44. Initial configuration of the input module 44 and the output module 46 is communicated from the processor module 14 via configuration communications 13 and 15, respectively. During power up or another user initiated configuration sequence, the processor module 14 transmits an initial configuration message 13 to the input module 44 and another initial configuration message 15 to the output module. The input module 44 sends a responsive configuration message 13 to the processor module 14, establishing communications between the processor and input modules, 44 and 14 respectively. The configuration message 15 to the output module 46 identifies the peer-to-peer relationship, defining the type of input module 44 to which the output module 46 is to connect and the data structure for that input module 44. Optionally, the peer-to-peer relationship may be established between the output module 46 and any other type of module as long as the initial configuration message 15 between the processor module 14 and the output module 46 defines the type of module and the corresponding data structure therein. The output module 46 then generates an initial configuration message 17 to the peer input module 44. The peer input module 44 sends a responsive configuration message 17 to the output module 46, establishing communications between the input module 44 and the output module 46. Upon successfully establishing the peer-to-peer connection, the output module 46 generates a responsive configuration message 15 to the processor module 14, establishing communications between the processor module 14 and the output module 46 as well as indicating to the processor module 14 that the peer-to-peer connection has been established.

After completing the initial configuration sequence and during normal operation, the processor module 14 periodically communicates with each of the input module 44 and the output module 46. Messages 25 between the processor module 14 and the output module 46 include, but are not limited to, updates to the output table from the processor module 14 to the output module 46 and operating status between each module. Similarly messages 21, 23 between the processor module 14 and the input module 44 include, but are not limited to, updates to the input table from the input module 44 to the processor module 14 and operating status between each module. The output module 46 also receives messages 23 from the input module that provide the current state of the input terminals 110 in the input module 44. In addition, a heartbeat message 31 may be communicated between the output module 46 and the input module 44 to verify that the communication channel between the two modules remains operational.

Figure 10:
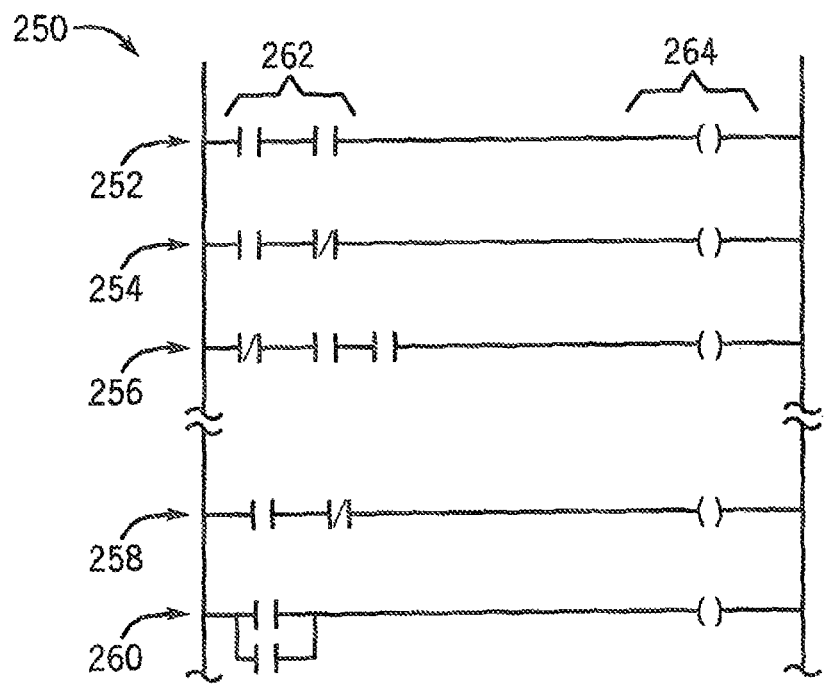
FIG. 10 is an exemplary set of programming instructions in ladder logic format to generate output signals fir an output module according to one embodiment of the present invention.

The output module 46 is configurable to generate an output signal at one or more of the output terminals 120 as a function of the messages from the controller or from the input module, 25 or 23 respectively. An exemplary segment of a control program 250 in "ladder logic" format is shown in FIG. 10. Typically, the processor module 14 receives the state of input signals 262 and sets/resets output signals 264 according to the control program executing in the processor 70. The desired state of these output signals 264 are, at least in part, the content of the control data transmitted via messages 25 between the processor module 14 and the output module 46. The output module 46 then generates output signals at the output terminals 120 as a function of this control data from the processor module 14. However, as previously discussed, scan time delays and transmission delays may limit the rate at which an output may be set in response to an input signal.

If an output module 46 is configured with a peer-to-peer connection to an input module 44, an output signal may be directly generated responsive to the input signal, increasing the responsiveness of the output module 46. In the distributed control network, both the input module 44 and the output module 46 which are configured in a peer-to-peer connection may be located at the same point on the controlled machine or process but remote from the central processor module 14. In fact, the input module 44 and the output module 46 may be mounted in the same rack and share a backplane 62. A table in the output module 46 may be configured to identify the address of each device to which a peer-to-peer connection is desired. The table further includes an entry for each output terminal 120 in the output module 46 which identifies each of the signals, either from an input module 44 or from the processor module 14, that are used to generate the output signal for that output terminal 120. The state of the input signals (e.g., on, off, logical one, or logical zero) and the correlation between input signals (e.g., logical AND or logical OR) are also stored in the table. As a result, any of the output terminals 120 may be controlled by the processor module 14, an input module 44, or a combination thereof. Optionally, an output module 46 may be configured to receive communications from an input module 44 mounted remotely via the network connections 30, 32, 36, 38 or from multiple modules connected locally, in the same rack, or remotely. By passing the input signals directly to the output module 46 and generating an output signal responsive to these input signals, the responsiveness of the output module 46 is improved.

The table storing the configuration of the output terminals 120 may be initially programmed directly via the operator interface 20 or indirectly by a module executing in the processing device 22 for the operator interface 20. Optionally, the module may execute in the processing module 14 of the industrial controller 10 or on any other processor suitable to execute the module. Referring again to FIG. 10, an operator may generate the control program 250 in the operator interface 20 or at another programming terminal. Rungs 258, 260, for example, receive inputs 262 used to generate output signals 264 for two of the output terminals 120 on an output module 46. According to one embodiment of the invention, the operator may directly enter the address and input signal information in the configuration table for download to the memory device 95 of the output module 46. According to another embodiment of the invention, the operator may enter all of the rungs 252-260 into the control program 250 and a module executing on the operator interface 20 or remote programming terminal identifies the input signals 262 and output signals 264 on rungs 258 and 260 as belonging to an input module 44 and output module 46 configurable for peer-to-peer connection. The module may move the instructions on rungs 258, 260 from the control program 250 to the configuration table and establish the peer-to-peer connection between the devices.

In cooperation with the configurable fault handling previously discussed, modules configured in the peer-to-peer configuration may have additional fault configuration parameters 330 to those shown in FIG. 11. An input module 44 and an output module 46 may be located remotely from the industrial controller 10 and configured to generate output signals via the peer-to-peer configuration. This configuration may control a remote operation on a machine or process that is desirable to maintain in the event the central industrial controller 10 exhibits a fault condition, for example, controlling a heater to keep fluid in a dip tank at a desired temperature. Because the control logic 258, 260 has been stored in the output module 46, the processor 75 in the output module 46 may continue to execute and generate the output signals in response to the communications 23 from the input module 44. A fault configuration parameter allows each of the input module 44 and the output module 46 to follow the fault state of either the industrial controller 10 or the peer module to which it is connected. Thus, the remote operation may continue to execute, which may speed recovery from a fault condition occurring at the industrial controller 10.

According to another aspect of the invention, the output module 44 is further configurable to receive override commands which may, for example, test operation of the output terminals 120 or of the peer-to-peer logic stored in the output module 44. The override command may force an output terminal 120 to a desired on or off state regardless of the state of the control logic which otherwise generates output signals for the output terminal 120. Optionally, the override command may force the state of an input signal in the input table to a desired on or off state regardless of the state of the physical signal. As a result, if the output module 46 is configured in peer-to-peer communications, one or more of the input signals from the peer input module 44 may be set in a desired state. The override commands may, therefore, be used to test operation of the output module 46 or the control logic configured therein.

According to another aspect of the invention, the output module 44 is further configurable to maintain a log of the output signals generated for each output terminal 120. Each output module 46 includes a clock circuit 85 synchronized to a master clock, according to, for example, the IEEE-1588 clock synchronization standard. At predefined time intervals, the state of each output terminal 120 is stored in the memory device 93 along with a time stamp, corresponding to the current time generated by the clock circuit 85. Optionally, the state of each output terminal 120 may be stored in the memory device 93, along with a corresponding time stamp, each time the output signal 47 changes state.

According to one embodiment of the invention, each output terminal 120 has a first-in, first-out (FIFO) buffer reserved in the memory device 95. At each interval, the present state of the output terminal 120 and a time stamp are stored in the FIFO buffer. Once the buffer is full, for example, after fifty entries, the oldest entry is overwritten. In this manner, a circular buffer is established, storing the state of each output terminals over the last fifty time intervals. Optionally, a single time stamp may be stored, corresponding to the status of each of the output terminals. According to another embodiment of the invention, the interval at which each output terminal is stored may be configurable and saved in a configuration parameter. Each of the FIFO buffers may be downloaded, for example, to the operator interface 20 or another remote computer. The entry having the earliest timestamp is identified and the state of the output visually displayed over the stored time interval. The data may be displayed, for example, as a table or as a strip chart showing transitions with respect to time. It is further contemplated, that multiple modules, including input modules 44, output modules 46, or any other module, may include a similar set of FIFO buffers. Because the clock in each of the modules is synchronized to the master clock, the data from multiple modules may be displayed over corresponding time intervals. Each of the override and data logging features may be used to reduce time and expense involved with commissioning or maintenance of the industrial control network.

This application incorporates by reference US patent applications, Ser. Nos. 13/443,591 and 13/443,537, filed on even date with the parent application Ser. No. 13/443,623, assigned to the same assignee as the present invention, and entitled: Industrial Control System with Distributed Motion Planning and Input Module for an Industrial Controller.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An output module for an industrial controller, wherein the industrial controller includes a processor module, at least one output module, and at least one input module, the output module comprising:
   a plurality of output terminals, wherein each output terminal is configured to be connected to and to transmit an output signal from the output module to a controlled device;
   a first communication interface between the processor module and the output module;
   a backplane connector, operative to be connected to a backplane extending between the output module and the input module;
   a second communication interface between the input module and the output module, wherein the second communication interface is established via the backplane connector and the backplane extending between the input module and the output module; and
   a processor configured to receive data via the second communication interface and to generate the output signal as a function of the data received from the second communication interface.

2. The output module of claim 1 wherein the processor is further configured to receive data via the first communication interface and to generate the output signal as a function of the data received from both the first communication interface and the second communication interface.

3. The output module of claim 2 wherein the processor is further configured to continue to generate the output signal as a function of the data received from the second communication interface when the data received from the first communication interface indicates the processor module is in a fault state.

4. The output module of claim 2 wherein the processor is further configured to execute in an intermediate fault state and in a final fault state.

5. The output module of claim 4 wherein the processor is further configured to enter the intermediate fault state and to generate the output signal as a function of the data received from the second communication interface when the data received from the first communication interface indicates the processor module is in a fault state.

6. The output module of claim 2 further comprising a memory device in communication with the processor, wherein the memory device is configured to store a logic table identifying how the data from both the first and the second communication interface is used to generate the output signal.

7. An industrial controller having peer communications between at least two modules, the industrial controller comprising:
    a processor module comprising:
        a first memory device configured to store a control program; and
        a first processor in communication with the first memory device and operative to execute the stored control program;
    an input module comprising:
        a plurality of input terminals, each input terminal configured to receive an input signal from an input device; and
        a second processor operative to receive the input signal from each of the plurality of input terminals;
    an output module comprising:
        a plurality of output terminals, wherein each output terminal is configured to be connected to and to transmit an output signal from the output module to an output device;
        a first interface in communication with the processor module and operative to receive control data from the processor module;
        a second interface in communication with the input module and operative to receive a status of at least one input signal from the input module, wherein the second interface does not pass through the processor module;
        a third processor configured to generate the output signal for at least one of the plurality of output terminals as a function of the status of the at least one input signal from the input module.

8. The industrial controller of claim 7 wherein the third processor is further configured to generate the output signal for at least one of the plurality of output terminals as a function of the status of the at least one input signal from the input module and of the control data from the processor module.

9. The industrial controller of claim 7 wherein the third processor is further configured to generate at least one output signal as a function of the status from the input module when the third processor module indicates a fault condition is present.

10. The industrial controller of claim 7 wherein the output module is configured to override at least one of the control data and the status of the input signal from the input module.

11. The industrial controller of claim 7 wherein the output module further comprises a third memory device configured to store a configuration table, wherein for each of the output terminals the configuration table includes:
    an address of the input module to which the second interface is communicating, and
    a logic table identifying how the status of each input signal is used to generate the output signal for the corresponding output terminal.

12. The industrial controller of claim 11 wherein the logic table is preconfigured and stored in the third memory device.

13. The industrial controller of claim 11 wherein a programmer interface selects a portion of the control program operative to execute in the first processor on the processor module and configures the logic table according to the selected portion.

14. An output module for an industrial controller, wherein the industrial controller includes a processor module, at least one output module, and at least one input module, and wherein the processor module is configured to execute a control program to control operation of an industrial machine or process, the output module comprising:
    a plurality of output terminals, wherein each output terminal is configured to be connected to and to transmit an output signal to an output device on the industrial machine or process;
    a first communication interface between the processor module and the output module;
    a backplane connector, operative to be connected to a backplane extending between the output module and the input module;
    a second communication interface between the input module and the output module, wherein the second communication interface is established via the backplane connector and the backplane extending between the input module and the output module; and
    a processor configured to receive data via the second communication interface and to generate the output signal as a function of the data received from the second communication interface, wherein the data from the second communication interface corresponds to an input signal received by the input module from an input device on the industrial machine or process.

15. The output module of claim 14 wherein the processor is further configured to execute at least a portion of the control program in the output module.

16. The output module of claim 15 wherein the data received from the second communication interface is provided as an input to the portion of the control program executing in the output module and the output signals are generated by the control program as a function of the data received from the second communication interface.

17. The output module of claim 16 wherein data received from the first communication interface is provided as an input to the portion of the control program executing in the output module and the output signals are generated by the control program as a function of the data received from both the first and the second communication interfaces.

18. The output module of claim 17 wherein a fault status of the processor module is transmitted from the processor module to the output module via the first interface and wherein the processor of the output module is configured to continue to execute the portion of the control program when the fault status indicates the processor module is faulted.

19. The output module of claim 14 wherein a first transmission between the processor module and the output module via the first communication interface enables the second communication interface.

\* \* \* \* \*